US012776602B2

(12) United States Patent
Shih et al.

(10) Patent No.: US 12,776,602 B2
(45) Date of Patent: Oct. 27, 2026

(54) MODULE MOUNTING DEVICE

(71) Applicant: Fulian Precision Electronics (Tianjin) Co., LTD., Tianjin (CN)

(72) Inventors: Tung-Ho Shih, New Taipei (TW); Hsuan-An Shih, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 120 days.

(21) Appl. No.: 18/931,298

(22) Filed: Oct. 30, 2024

(65) Prior Publication Data

US 2025/0273892 A1 Aug. 28, 2025

(30) Foreign Application Priority Data

Feb. 27, 2024 (CN) ......................... 202410215141.9

(51) Int. Cl.
*H01R 13/24* (2006.01)
*F16B 5/06* (2006.01)

(52) U.S. Cl.
CPC ....... *H01R 13/2421* (2013.01); *F16B 5/0628* (2013.01); *F16B 5/0657* (2013.01)

(58) Field of Classification Search
CPC ..... G06F 1/16; H01R 13/2421; F16B 5/0628; F16B 5/0657
USPC ........ 248/274.1, 200, 205.1, 220.21, 220.22, 248/222.52; 361/679.02, 679.32, 679.38
See application file for complete search history.

(56) References Cited

U.S. PATENT DOCUMENTS

| | | | | |
|---|---|---|---|---|
| 8,498,107 B2 * | 7/2013 | Liu | G06F 1/185 | 361/679.37 |
| 8,582,288 B2 * | 11/2013 | Cheng | G11B 33/124 | 361/732 |
| 2006/0126288 A1 * | 6/2006 | Chen | G06F 1/184 | 361/679.33 |
| 2007/0025068 A1 * | 2/2007 | Chen | G11B 33/124 | |
| 2007/0274034 A1 * | 11/2007 | Yang | G06F 1/187 | 720/601 |
| 2010/0208423 A1 * | 8/2010 | Lai | G06F 1/187 | 361/679.38 |
| 2016/0183401 A1 * | 6/2016 | Chen | G06F 1/187 | 29/428 |

FOREIGN PATENT DOCUMENTS

| | | |
|---|---|---|
| TW | 200906008 A | 2/2009 |
| TW | 201032023 A1 | 9/2010 |
| TW | M483460 U | 8/2014 |

* cited by examiner

*Primary Examiner* — Monica E Millner
(74) *Attorney, Agent, or Firm* — ScienBiziP, P.C.

(57) ABSTRACT

A module mounting device includes a bracket, a mounting member, a connecting rod, and a probe assembly. The bracket can mount a first module. The mounting member is slidably connected to the bracket, the mounting member includes a mounting portion, the mounting portion can mount a second module. The connecting rod is rotatably connected to the bracket and is slidably connected to the mounting member. The probe assembly is disposed on the bracket, a portion of the probe assembly extends through the bracket and is connected to the connecting rod. Wherein the probe assembly is configured to drive the connecting rod to rotate under a pressing force from the first module, and the connecting rod is configured to drive the mounting portion to protrude relative to the bracket.

15 Claims, 10 Drawing Sheets

MODULE MOUNTING DEVICE

FIELD

The subject matter herein generally relates to fixtures, and more particularly, to a module mounting device.

BACKGROUND

When different modules are assembled into a same space, due to limitation of the space, there is a risk of interference between the different modules during assembling, which increases a difficulty of the assembly process and reduces assembly efficiency. Therefore, there is a room for improvement in the art.

BRIEF DESCRIPTION OF THE DRAWINGS

Implementations of the present technology will now be described, by way of example only, with reference to the attached figures.

DETAILED DESCRIPTION

Figure 1:
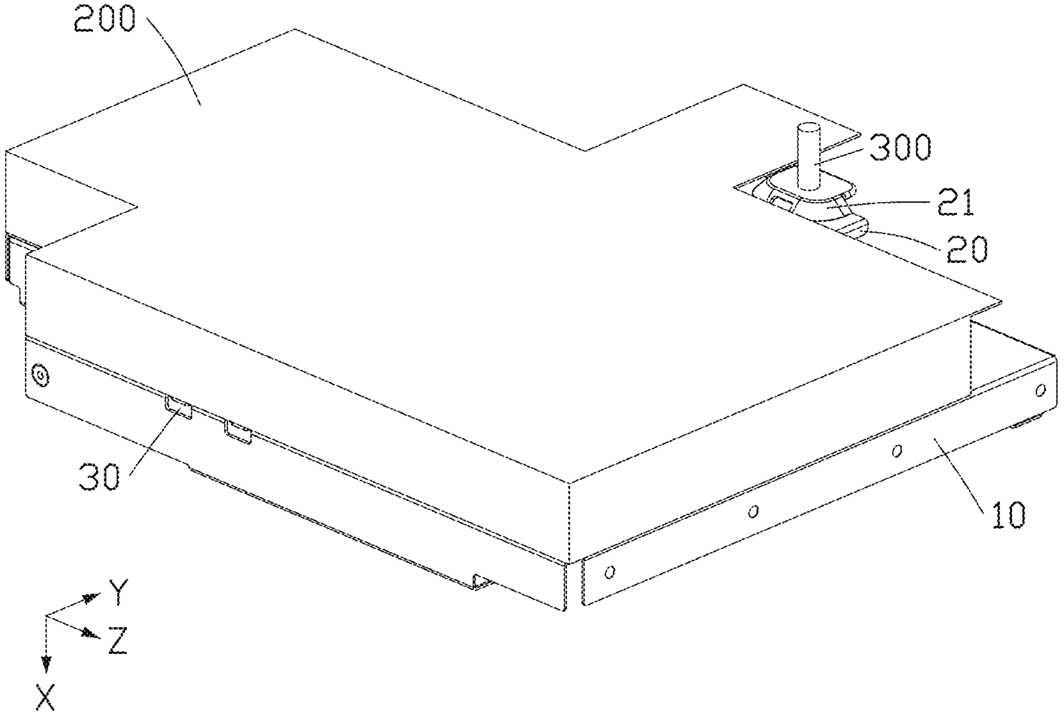
FIG. 1 is a diagrammatic view including a module mounting device, a first module, and a second module according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Some embodiments of the present disclosure will be described in detail with reference to the drawings. If no conflict, the following embodiments and features in the embodiments can be combined with each other.

Figure 2:
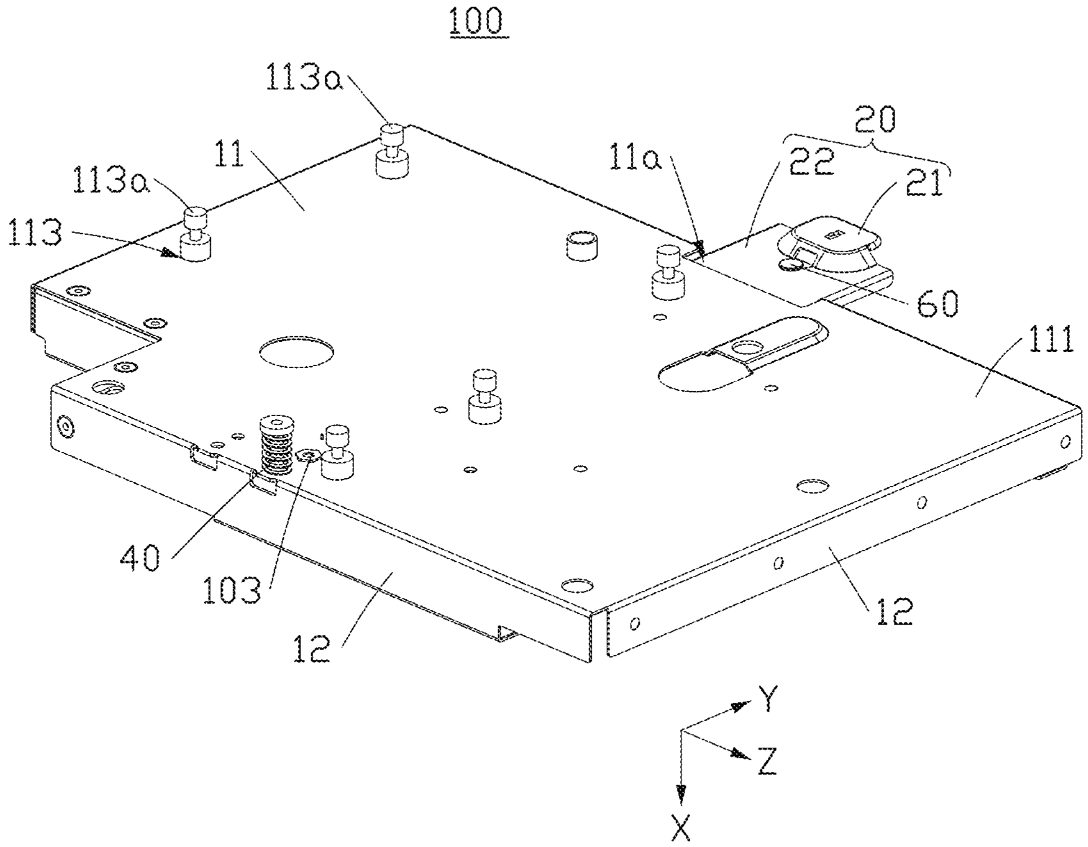
FIG. 2 is a diagrammatic view of the module mounting device of FIG. 1.
Figure 3:
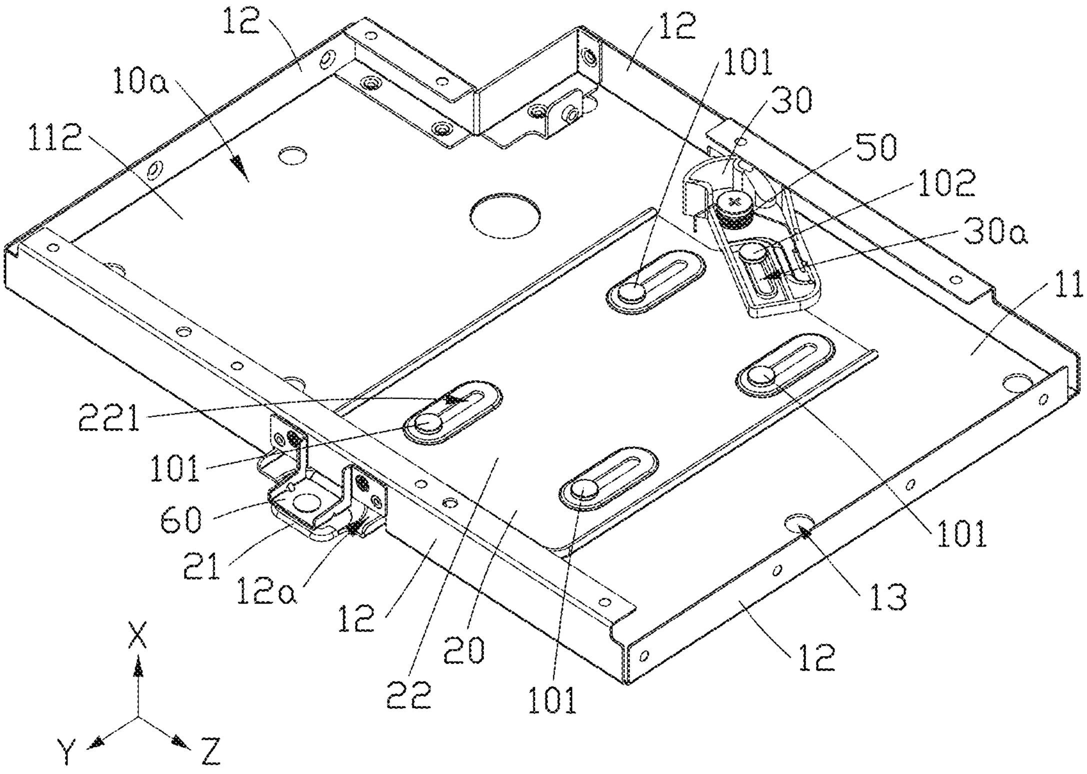
FIG. 3 is similar to the FIG. 2, but showing the module mounting device from another angle.

Referring to FIGS. 1-3, a module mounting device 100 is provided according to an embodiment of the present disclosure. The module mounting device 100 includes a bracket 10, a mounting member 20, a connecting rod 30, and a probe assembly 40. The bracket 10 includes a wall 11. The wall 11 includes a first mounting surface 111 and a second mounting surface 112 opposite to each other in a first direction X. A first module 200 can be mounted on the first mounting surface 111. The mounting member 20 is slidably connected to the second mounting surface 112. The mounting member 20 includes a mounting portion 21 for mounting a second module 300. The connecting rod 30 is rotatably connected to the second mounting surface 112 and slidably connected to the mounting member 20. The probe assembly 40 is disposed on the first mounting surface 111. A portion of the probe assembly 40 extends through the first mounting surface 111 and is connected to the connecting rod 30. When the first module 200 is installed, the probe assembly 40 can be pushed by the first module 200, and the probe assembly 40 drives the connecting rod 30 to rotate, which in turn drives the mounting portion 21 to slide and extend relative to the bracket 10.

When installing the first module 200, the first module 200 drives the probe assembly 40 to press the connecting rod 30, and the connecting rod 30 rotates to drive the mounting portion 21 to protrude relative to the bracket 10, which facilitates the installation of the second module 300. When the mounting portion 21 does not protrude relative to the bracket 10, an interference between the mounting portion 21 and other modules may be reduced, which reduces the assembly difficulty and improves assembly efficiency.

Figure 9:
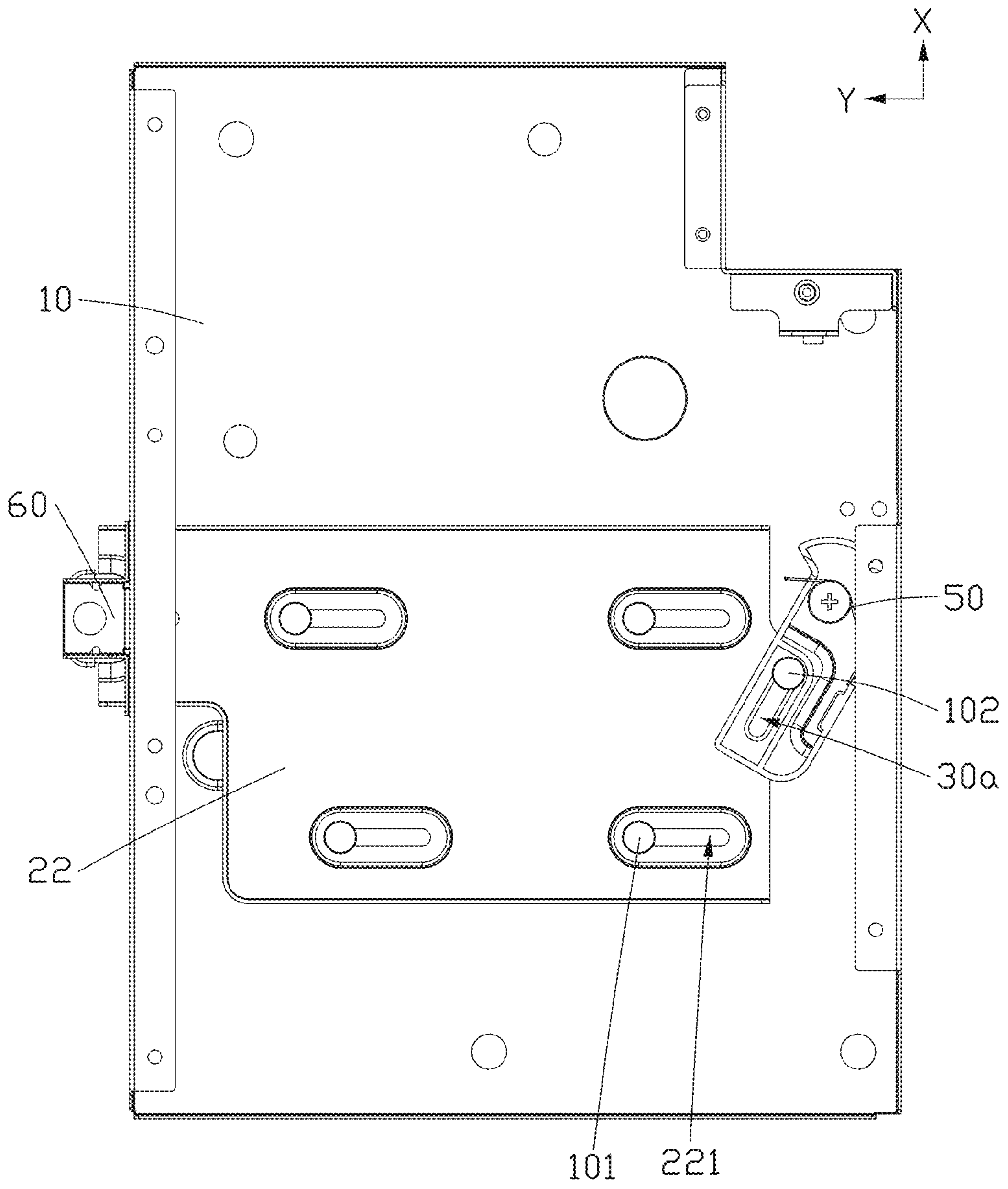
FIG. 9 is a diagrammatic view showing the mounting member of FIG. 2 in a retracted state.

Referring to FIGS. 2, 3, and 9, in some embodiments, the wall 11 is provided with a plurality of connecting holes 113. Each connecting hole 113 extends through the wall 11. The connecting hole 113 is provided with a protruding portion **113*a* therein for connecting the first module 200, so that the first module 200 can be mounted on the first mounting surface 111**.

In some embodiments, the bracket 10 further includes a sidewall 12 connected to the wall 11. The wall 11 and the sidewall 12 cooperatively define a receiving space **10*a*. The connecting rod 30 and a portion of the mounting member 20 are disposed in the receiving space 10*a*, thereby reducing a space occupied by the connecting rod 30 and the mounting member 20, improving space utilization and reducing an overall space occupied by the module mounting device 100**.

In some embodiments, the wall 11 is further provided with a first opening **11*a*, and the sidewall 12 is provided with a second opening 12*a*. The first opening 11*a* is communicated with the second opening 12*a*, thereby facilitating the installation of the mounting member 20 into the bracket 10. The mounting portion 21 protrudes from the first opening 11*a* and the second opening 12*a***.

Figure 4:
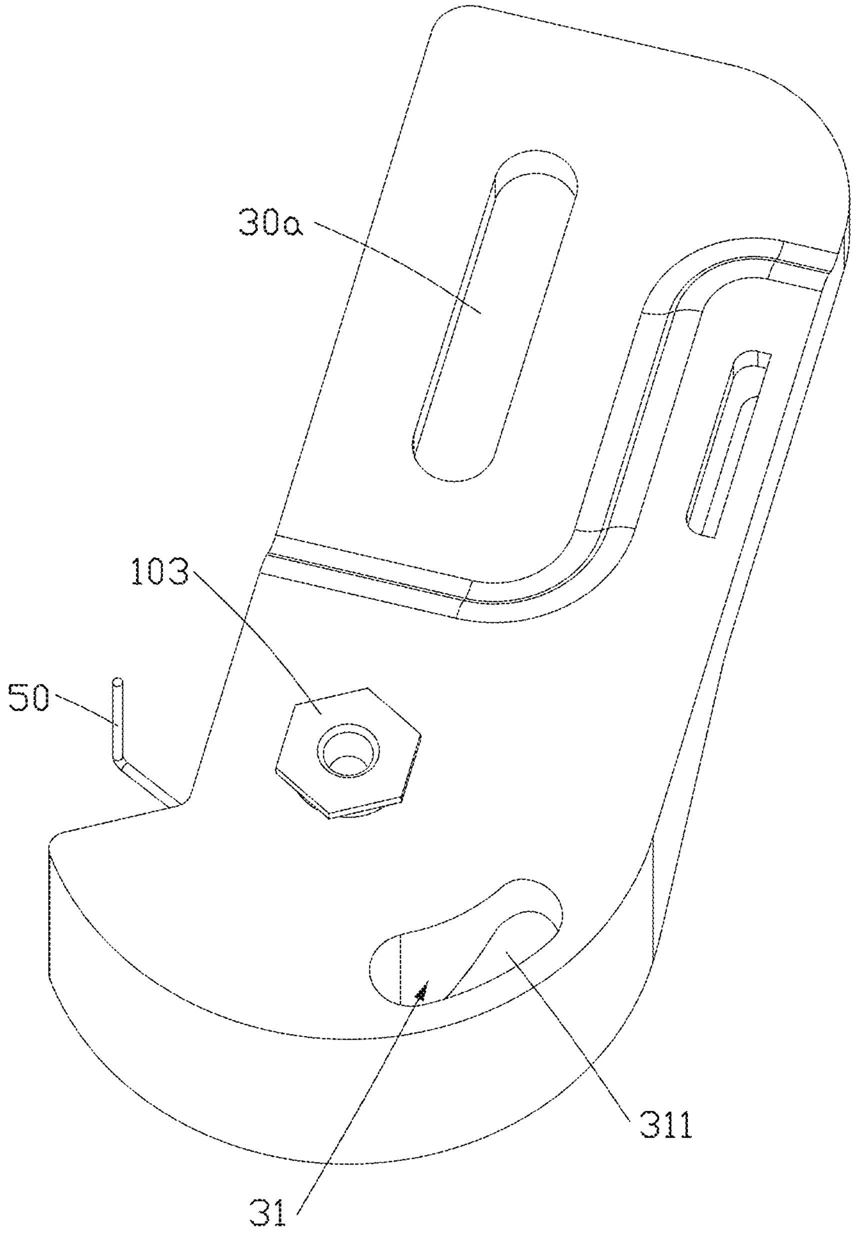
FIG. 4 is a diagrammatic view of a connecting rod of the module mounting device in FIG. 3.
Figure 5:
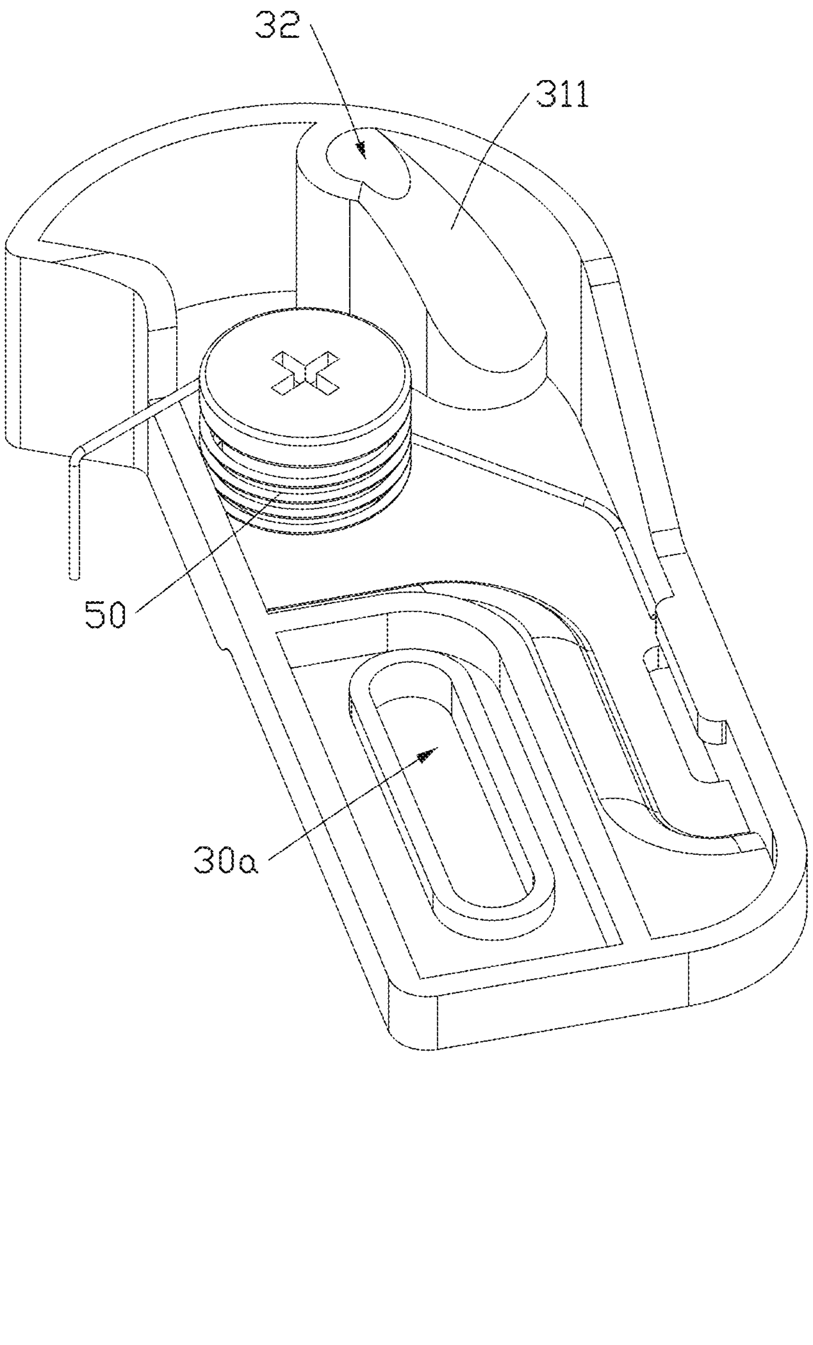
FIG. 5 is similar to the FIG. 4, but showing the connecting rod from another angle.
Figure 6:
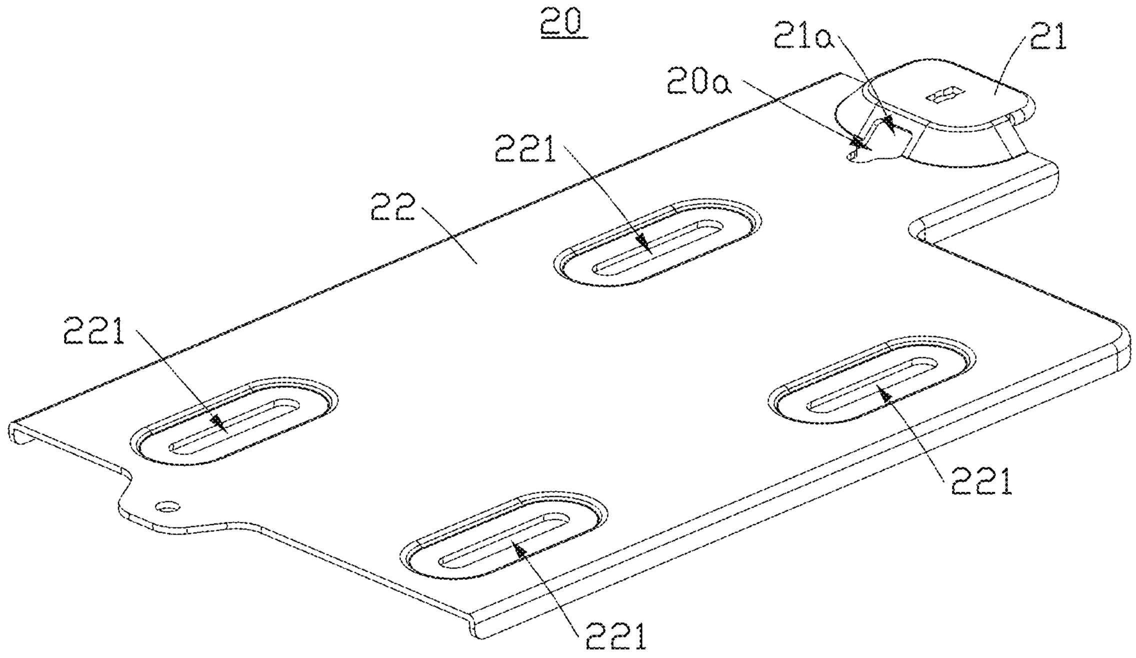
FIG. 6 is a diagrammatic view of a mounting member of the module mounting device in FIG. 2.
Figure 7:
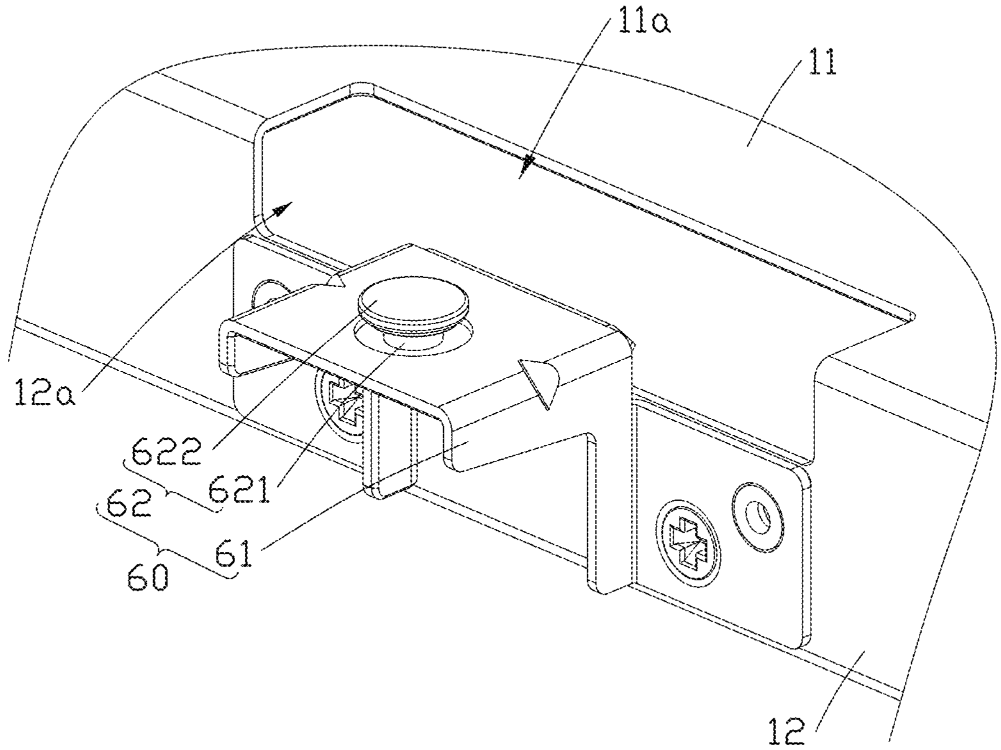
FIG. 7 is a diagrammatic view of a limiting member of the module mounting device in FIG. 2.
Figure 8:
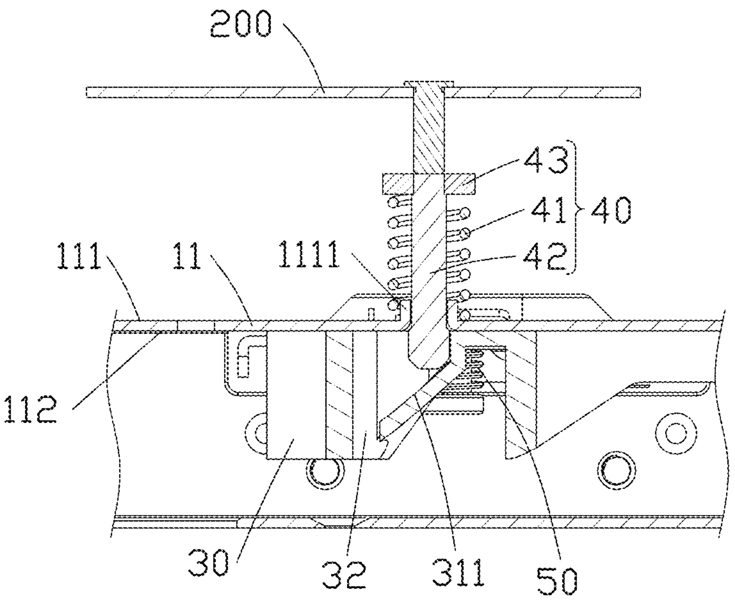
FIG. 8 is a cross-sectional view of a portion of the module mounting device and the first module of FIG. 1.

Referring to FIGS. 3, 4 and 6, in some embodiments, the mounting member 20 includes a main body 22 connected to the mounting portion 21. The mounting portion 21 can protrude from the main body 22 in a direction opposite to the first direction X.

In some embodiments, the main body 22 is provided with at least one first chute 221 extending along a second direction Y. The second direction Y is perpendicular to the first direction X. The main body 22 is slidably connected to the second mounting surface 112 through the first chute 221.

In some embodiments, the main body 22 is provided with a plurality of first chutes 221. The main body 22 is provided with four first chutes 221, and the four first sliding slots 221 are disposed in a rectangular shape.

In some embodiments, the module mounting device 100 further includes a first fixing member 101. The first fixing member 101 passes through the first chute 221 and is fixed to the wall 11, so that the mounting member 20 can slide relative to the wall 11 along the second direction Y.

In some embodiments, the connecting rod 30 is provided with a second chute 30*a*, and the main body 22 is slidably connected to the second chute 30*a*. The module mounting device 100 further includes a second fixing member 102. The second fixing member 102 passes through the second chute 30*a* and is fixed to the wall 11, so that the connecting rod 30 is slidably connected to the main body 22. An extending direction of the second chute 30*a* intersects with both the first direction X and the second direction Y.

In some embodiments, a connection area between the second fixing member 102 and the wall 11 is disposed between adjacent first chutes 221 in a third direction Z, which is beneficial for the main body 22 to slide relative to the wall 11. The third direction Z is perpendicular to the first direction X and the second direction Y.

Referring to FIGS. 2, 3, and 5 to 7, in some embodiments, the module mounting device 100 further includes a connecting shaft 103 fixed to the wall 11. The connecting rod 30 is rotatably connected to the connecting shaft 103. The connecting rod 30 can rotate relative to the connecting shaft 103.

In some embodiments, a recess 31 is defined on the connecting rod 30. The recess 31 includes an inclined surface 311. The probe assembly 40 is connected to the inclined surface 311. When the probe assembly 40 is pressed, the connecting rod 30 is driven to rotate relative to the connecting shaft 103, and the main body 22 is driven to slide along the second sliding groove 30*a* and the first sliding groove 221. The mounting portion 21 protrudes relative to the bracket 10 and the first module 200.

In some embodiments, a positioning hole 32 is defined on the connecting rod 30. The positioning hole 32 extends through the recess 31 and connects to a lower end of the inclined surface 311. After the first module 200 is mounted on the first mounting surface 111, a portion of the probe assembly 40 is disposed in the positioning hole 32, thereby fixing the mounting portion 21 and the connecting rod 30.

In some embodiments, the probe assembly 40 includes a first elastic member 41, a probe 42, and a connecting member 43. One end of the first elastic member 41 is connected to the first mounting surface 111, and another end of the first elastic member 41 is connected to the connecting member 43. The probe 42 is connected to the connecting member 43, and the probe 42 extends through the first elastic member 41 and is connected to the inclined surface 311.

In some embodiments, the first mounting surface 111 is provided with a protrusion 1111. One end of the first elastic member 41 is sleeved on the protrusion 1111. The first elastic member 41 can be a spring, the first elastic member 41 can elastically deformable in along the first direction X.

In some embodiments, the module mounting device 100 further includes a second elastic member 50 connected to the connecting rod 30. The second elastic member 50 drives the connecting rod 30 to rotate, thereby causing the connecting rod 30 to drive the mounting member 20 to retract. The second elastic member 50 can be a torsion spring, and the second elastic member 50 can generate torsional deformation around the first direction X.

When the first module 200 is mounted on the first mounting surface 111, the first elastic member 41 is compressed. The probe 42 drives the connecting rod 30 to rotate, and the connecting rod 30 will apply a force during the rotation onto the second elastic member 50. When the first module 200 is disassembled, the first elastic member 41 rebounds, thereby driving the probe 42 to disengage from the positioning hole 32, and the second elastic member 50 drives the connecting rod 30 to rotate in an opposite direction, causing the connecting rod 30 to drive the mounting member 20 to retract.

Referring to FIGS. 2 to 4 and 8 to 10, in some embodiments, the module mounting device 100 further includes a limiting member 60. The limiting member 60 includes a limiting body 61 and a limiting portion 62. The limiting body 61 is connected to the bracket 10, and the limiting portion 62 is connected to the limiting body 61. The mounting member 20 is provided with a limiting hole 20*a*. When the mounting portion 21 protrudes from the main body 22, the limiting portion 62 is accommodated in the limiting hole 20*a*.

In some embodiments, the limiting body 61 is fixed to the sidewall 12.

In some embodiments, the mounting portion 21 is provided with a through hole 21*a*. The limiting hole 20*a* extends through the main body 22, and the through hole 21*a* communicates with the limiting hole 20*a*. When the mounting portion 21 protrudes from the main body 22, the limiting portion 62 extends through the through hole 21*a* and is clamped in the limiting hole 20*a*, which facilitates the positioning of the mounting portion 21.

In some embodiments, the limiting portion 62 includes a first limiting area 621 and a second limiting area 622. The first limiting area 621 is connected to the limiting body 61, and the second limiting area 622 is connected to the first limiting area 621. When the first module 200 is mounted on the first mounting surface 111, the first limiting area 621 is clamped in the limiting hole 20*a*, and the second limiting area 622 covers at least a portion of the limiting hole 20*a*, which can enhance the stability of the mounting member 20 and prevent the first limiting area 621 from disengaging from the limiting hole 20*a*.

Figure 10:
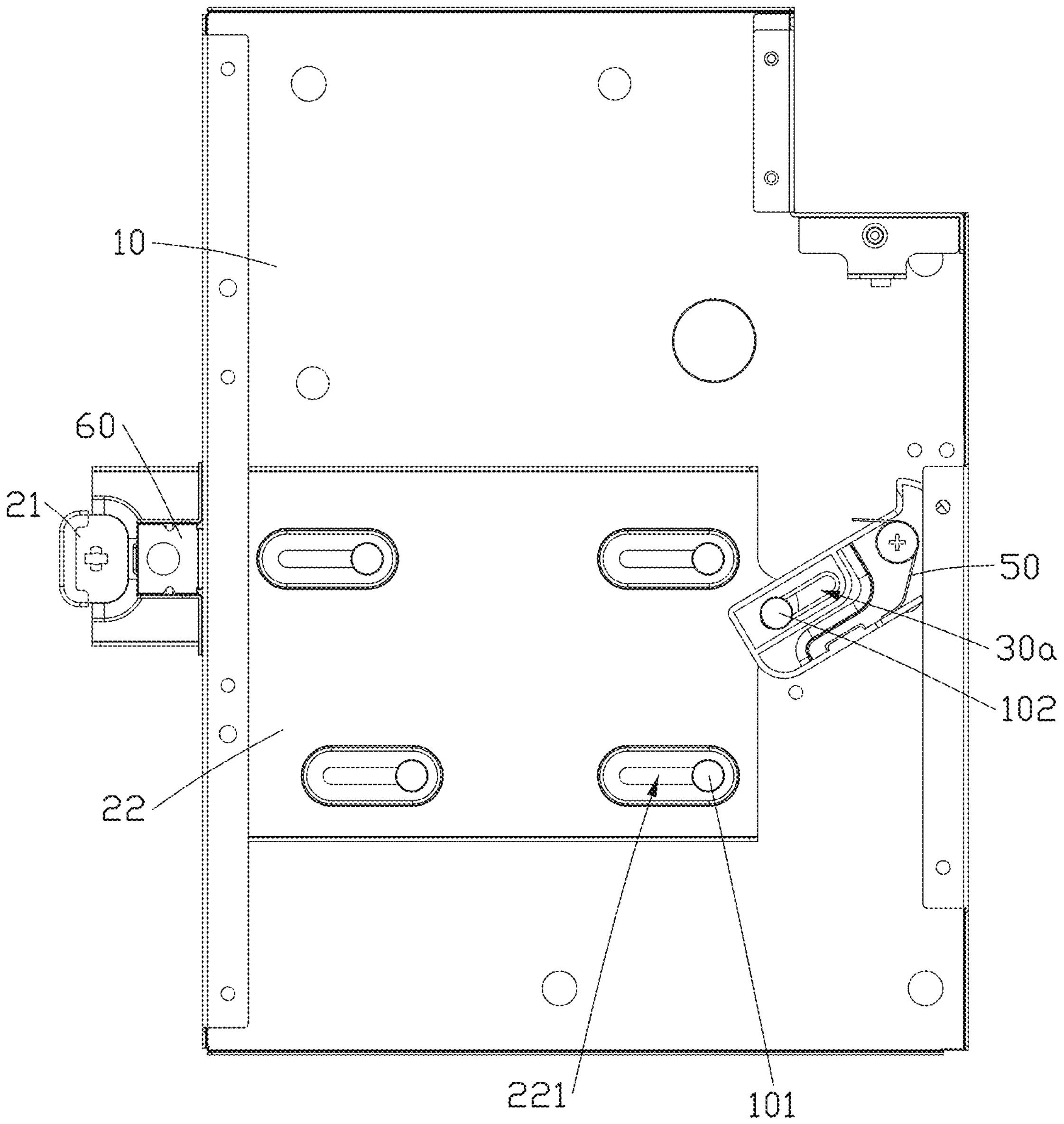
FIG. 10 is a diagrammatic view showing the mounting member o of FIG. 2 in a protruding state.

Referring to FIGS. 1, 9, and 10, when the module mounting device 100 is in use, the first module 200 is first installed. When the first module 200 is mounted on the first mounting surface 111, the first module 200 compresses the first elastic member 41, and the connecting member drives the probe 42 to press against the inclined surface 311 and be accommodated in the positioning hole 32. The probe 42 then drives the connecting rod 30 to rotate, thereby causing the connecting rod 30 to drive the mounting member 20 to slide, allowing the mounting portion 21 to protrude relative to the bracket 10. The first limiting area 621 is then clamped in the limiting hole 20*a*, and the second module 300 is installed on the mounting portion 21. When the first module 200 is disassembled, the first elastic member 41 rebounds and drives the probe 42 to protrude from the positioning hole 32, and the second elastic member 50 drives the connecting rod 30 to rotate in the opposite direction, which in turn drives the mounting member 20 to retract. The second module 300 can be disassembled before or after disassembling the first module 200.

When installing the first module 200, the first module 200 drives the probe assembly 40 to press the connecting rod 30, and the connecting rod 30 rotates to drive the mounting portion 21 to protrude relative to the bracket 10, which facilitates the installation of the second module 300. When the mounting portion 21 does not protrude relative to the bracket 10, an interference between the mounting portion 21 and other modules may be reduced, which reduces the assembly difficulty and improves assembly efficiency. The mounting member 20, connecting rod 30, and probe assembly 40 can all automatically reset, which reduces operational time and enhances disassembly efficiency.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A module mounting device comprising:

a bracket comprising a wall, the wall comprising a first mounting surface and a second mounting surface opposite to each other in a first direction perpendicular to the wall, the first mounting surface configured to mount a first module;

a mounting member slidably connected to the second mounting surface, the mounting member comprising a mounting portion, the mounting portion configured to mount a second module;

a connecting rod rotatably connected to the second mounting surface and slidably connected to the mounting member; and a probe assembly disposed on the first mounting surface, a portion of the probe assembly extending through the first mounting surface and connected to the connecting rod;

wherein the probe assembly is configured to drive the connecting rod to rotate under a pressing force from the first module, and the connecting rod is configured to drive the mounting portion to protrude relative to the bracket.

2. The module mounting device of claim 1, wherein the connecting rod defines a recess, the recess comprises an inclined surface, and the probe assembly is connected to the inclined surface.

3. The module mounting device of claim 2, wherein the connecting rod further defines a positioning hole, the positioning hole extends through the recess, and a portion of the probe assembly is disposed in the positioning hole when the first module is mounted on the first mounting surface.

4. The module mounting device of claim 2, wherein the probe assembly comprises a first elastic member, a probe, and a connecting member, one end of the first elastic member is connected to the first mounting surface, another end of the first elastic member is connected to the connecting member, the probe is connected to the connecting member, the probe extends through the first elastic member and is connected to the inclined surface.

5. The module mounting device of claim 4, wherein the first elastic member is a spring, and the first elastic member is elastically deformable in the first direction.

6. The module mounting device of claim 1, further comprising a limiting member, wherein the limiting member comprises a limiting body and a limiting portion, the limiting body is connected to the bracket, and the limiting portion is connected to the limiting body, the mounting member defines a limiting hole, and the limiting portion is accommodated in the limiting hole when the mounting portion protrudes relative to the bracket.

7. The module mounting device of claim 6, wherein the mounting member further comprises a main body connected to the mounting portion, the mounting portion is configured to protrude relative to the bracket in a direction opposite to the first direction, the mounting portion defines a through hole, and the limiting hole extends through the main body and communicates with the through hole.

8. The module mounting device of claim 6, wherein the limiting portion comprises a first limiting area and a second limiting area, the first limiting area is connected to the limiting body, and the second limiting area is connected to the first limiting area, the first limiting area is clamped in the limiting hole when the first module is mounted on the first mounting surface, and the second limiting area covers at least a portion of the limiting hole.

9. The module mounting device of claim 6, wherein the bracket further comprises a sidewall connected to the wall, the wall and the sidewall cooperatively define a receiving space, and the connecting rod is disposed in the receiving space.

10. The module mounting device of claim 9, wherein the wall further defines a first opening, the sidewall defines a second opening communicating with the second opening, and the mounting portion protrudes from the first opening and the second opening.

11. The module mounting device of claim 7, wherein the main body further defines at least one first chute, the main body is slidably connected to the second mounting surface through the at least one first chute, the connecting rod defines a second chute, and the main body is slidably connected to the second chute.

12. The module mounting device of claim 11, wherein the at least one first chute extending along a second direction, and an extending direction of the second chute intersects with both the first direction and the second direction.

13. The module mounting device of claim 11, wherein the second direction is perpendicular to the first direction.

14. The module mounting device of claim 1, further comprising a second elastic member, wherein the second elastic member is connected to the connecting rod, the second elastic member is configured to drive the connecting rod to rotate, thereby causing the connecting rod to drive the mounting member to retract.

15. The module mounting device of claim 14, wherein the second elastic member is a torsion spring, and the second elastic member is configured to generate torsional deformation around the first direction.

* * * * *